(12) United States Patent
Ankenapalli et al.

(10) Patent No.: US 8,875,084 B1
(45) Date of Patent: Oct. 28, 2014

(54) OPTIMAL SPARE LATCH SELECTION FOR METAL-ONLY ECOS (71) Applicant: International Business Machines Corporation, Armonk, NY (US)

(72) Inventors: Vijay K. Ankenapalli, Bangalore (IN); Ayan Datta, Bangalore (IN); Sumitha George, Bangalore (IN); Charudhattan Nagarajan, Bangalore (IN); James D. Warnock, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/945,191

(22) Filed: Jul. 18, 2013

(51) Int. Cl.
   G06F 17/50 (2006.01)
(52) U.S. Cl.
   CPC ................................. G06F 17/50 (2013.01)
   USPC ............................................................ 716/136
(58) Field of Classification Search
   USPC .......................................................... 716/136
   See application file for complete search history.

(56) References Cited

U.S. PATENT DOCUMENTS

| | | | |
|---|---|---|---|
| 5,953,236 A | 9/1999 | Hossain et al. | |
| 6,446,248 B1 | 9/2002 | Solomon et al. | |
| 6,453,454 B1 | 9/2002 | Lee et al. | |
| 6,922,817 B2 | 7/2005 | Bradfield et al. | |
| 7,219,317 B2 | 5/2007 | Lakshmanan et al. | |
| 7,231,626 B2 | 6/2007 | Hoff et al. | |
| 7,610,568 B2 | 10/2009 | Alter et al. | |
| 8,166,439 B2 | 4/2012 | Hopkins et al. | |
| 8,296,707 B2 * | 10/2012 | Amundson et al. | 716/122 |
| 2006/0288323 A1 | 12/2006 | Birch | |
| 2008/0301614 A1 | 12/2008 | St. Juste et al. | |

OTHER PUBLICATIONS

Chang et al., Timing ECO Optimization Using Metal-Configurable Gate-Array Spare Cells, Copyright 2012 ACM.
Anonymous, "Method and System for Placement of Spare Circuitry in an Integrated Circuit Design", IP.com No. IPCOM000201541D, Nov. 15, 2010.

* cited by examiner

Primary Examiner — Jack Chiang
Assistant Examiner — Brandon Bowers
(74) Attorney, Agent, or Firm — David Cain; Hoffman Warnick LLC (57) ABSTRACT Various embodiments include: determining boundary vertices for an ECO within a placed netlist based on: a first weight assigned to a gate array distribution; and a second weight assigned to routing congestion, the boundary vertices defining a polygon; implementing the ECO at gate level; estimating slack value for determined boundary vertices; assigning vertex weights to boundary vertices based on the estimated slack values for boundary vertices; calculating a weighted centroid location for the polygon, based on the vertex weights; locating spare latches in the placed netlist; determining a clock domain and a clock gating domain for each located spare latch; assigning a cost function to each located spare latch having a same clock domain and a same clock gating domain as the ECO; ranking each respective cost function for each located spare latch; and selecting the desired spare latch based on the ranking of the each located spare latch.

18 Claims, 5 Drawing Sheets

OPTIMAL SPARE LATCH SELECTION FOR METAL-ONLY ECOS

FIELD

The subject matter disclosed herein relates generally to integrated circuits. More particularly, the subject matter disclosed relates to selection of a spare latch for implementation into an engineering change order (ECO).

BACKGROUND

In general, design changes come up in the final phase of the circuit design, which need to be implemented without affecting the processed sections. These changes are conventionally known as an engineering change order (ECO). In order to satisfy the need to implement these ECOs, spare circuitry is normally included in the circuit design. Spare latches are an example of this spare circuitry and are often used to implement the ECOs.

Spare latches, which are initially not part of a data path or logic circuit, are often spread out within a design pattern. When necessary, a circuit or physical design engineer typically selects spare latches that appear to be nearest to a desired location on the chip. However the closest spare latch may not be the best from a timing and routing point of view. Typically, the logic designer does not have the ability to reliably choose a correct spare latch which will close design from a timing point of view. For example the nearest spare latch may be in a different clock gating domain from the data path into which the designer may wish to insert it.

BRIEF DESCRIPTION

Various aspects of the invention provide for methods of selecting a spare latch for an ECO in a placed netlist. A first aspect provides a computer-implemented method of selecting a desired spare latch in a placed netlist the method comprising: determining boundary vertices for an engineering change order (ECO) within the placed netlist based on: a first weight assigned to a gate array distribution; and a second weight assigned to routing congestion, the boundary vertices defining a polygon; implementing the ECO at gate level with the placed netlist; estimating slack value for each determined boundary vertex; assigning vertex weights to each boundary vertex based on the estimated slack values for each respective boundary vertex; calculating a weighted centroid location for the polygon, based on the vertex weights; locating spare latches in the placed netlist; determining a clock domain and a clock gating domain for each located spare latch; assigning a cost function to each located spare latch having a same clock domain and a same clock gating domain as the ECO; ranking each respective cost function for each located spare latch; and selecting the desired spare latch based on the ranking of the each located spare latch.

A second aspect provides a system comprising: at least one computing device configured to select a desired spare latch in a placed netlist by performing actions including: determining boundary vertices for an engineering change order (ECO) within the placed netlist based on: a first weight assigned to a gate array distribution; and a second weight assigned to routing congestion, the boundary vertices defining a polygon; implementing the ECO at gate level within the placed netlist; estimating slack value for each determined boundary vertex; assigning vertex weights to each boundary vertex based on the estimated slack values for each respective boundary vertex; calculating a weighted centroid location for the polygon, based on the vertex weights; locating spare latches in the placed netlist; determining a clock domain and a clock gating domain for each located spare latch; assigning a cost function to each located spare latch having a same clock domain and a same clock gating domain as the ECO; ranking each respective cost function for each located spare latch; and selecting the desired spare latch based on the ranking of the each located spare latch.

A third aspect provides a computer program product comprising program code stored on a computer-readable storage medium, which when executed by at least one computing device, enables the at least one computing device to select a desired spare latch by performing actions including: determining boundary vertices for an engineering change order (ECO) within the placed netlist based on: a first weight assigned to a gate array distribution; and a second weight assigned to routing congestion, the boundary vertices defining a polygon; implementing the ECO at gate level within the placed netlist; estimating slack value for each determined boundary vertex; assigning vertex weights to each boundary vertex based on the estimated slack values for each respective boundary vertex; calculating a weighted centroid location for the polygon, based on the vertex weights; locating spare latches in the placed netlist; determining a clock domain and a clock gating domain for each located spare latch; assigning a cost function to each located spare latch having a same clock domain and a same clock gating domain as the ECO; ranking each respective cost function for each located spare latch; and selecting the desired spare latch based on the ranking of the each located spare latch.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The subject matter disclosed herein relates generally to integrated circuits. More particularly, the subject matter disclosed relates to selection of a spare latch for implementation into an engineering change order.

In general, design changes come up in the final phase of the circuit design, which need to be implemented without affecting the processed sections of an integrated circuit. These changes are conventionally known as an engineering change order (ECO). In order to satisfy the need to implement these ECOs, spare circuitry is normally included in the circuit design. Spare latches are an example of this spare circuitry and are often used to implement the ECOs.

Spare latches, which are initially not part of a data path or logic circuit, are often spread out within a design pattern. When executing an ECO, a logic designer typically selects spare latches that appear to be nearest to a desired location on the chip. However, the spare latch closest to a logic circuit or data path may not be the optimal choice from timing and routing point of view. Typically, the logic designer does not have the ability to choose an optimal spare latch to close a design from timing point of view. For example the nearest spare latch may be in a different clock gating domain from the logic circuit or data path into which the designer may need to insert it. So currently, when a logic designer chooses a spare latch based on proximity alone, multiple iterations of manual intervention are often required before a spare latch is found which shares the proper clock domain and clock gating domain as the logic circuit/data path associated with the ECO.

As differentiated from conventional attempts, aspect of the invention provide a method of spare latch selection taking into account the clock domain and the clock gating domain of the logic circuit/data path for which the spare latch is selected. Selection of a spare latch involves changes only to the metal layers (interconnects) within a chip, while the base layers (for cells) remain the same. Methods according to aspects of the invention also take into consideration density of gate array cells and routing congestion in the appropriate cell neighborhood in order to ensure successful implementation of metal-only ECOs while ensuring design closure from a timing point of view. Embodiments described herein allow for selection of a spare latch in a single iteration to implement an ECO and attain complete design closure.

Figure 1:
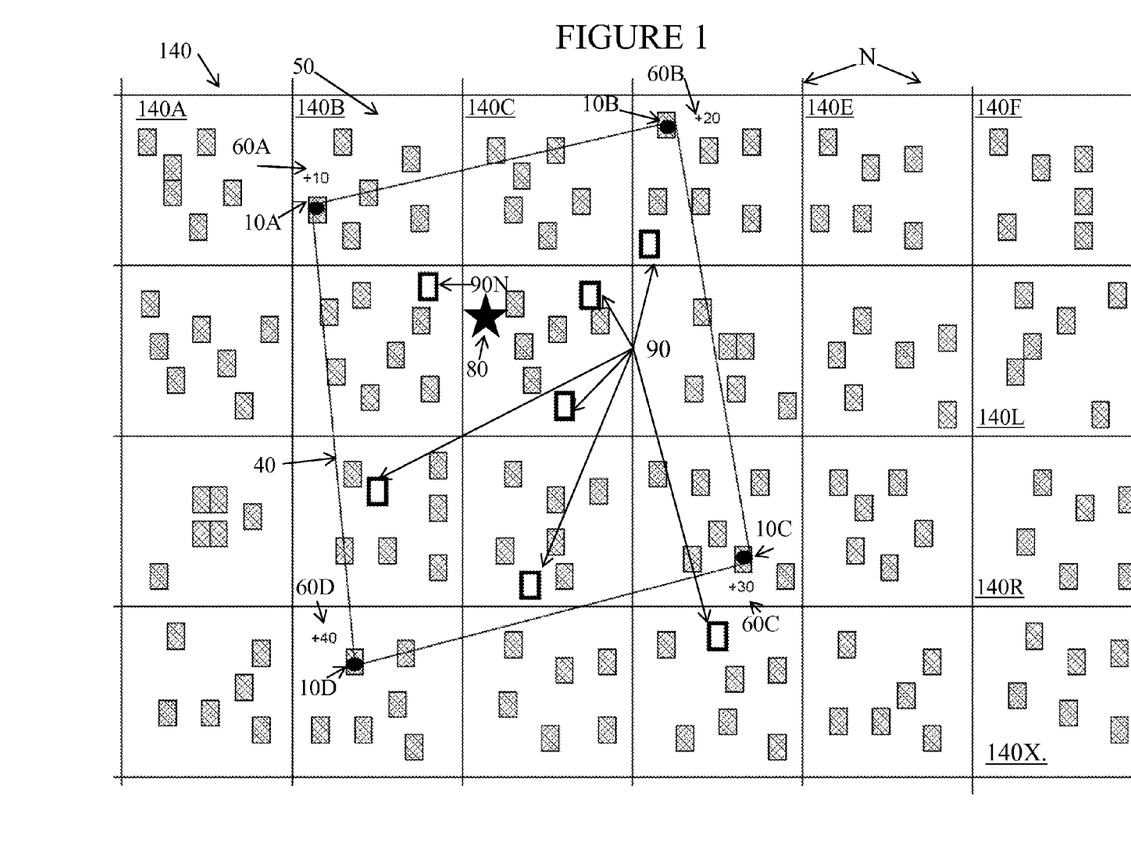
FIG. 1 illustrates a placed netlist in an integrated circuit design according to various embodiments.

Now turning to FIG. 1, a placed netlist in an integrated circuit design is illustrated. It is understood that a placed netlist is used to describe a placed netlist or layout. FIG. 1 shows that integrated circuit design 140 is segmented into 24 equal bins 140A-X (not all bins are labeled for the sake of clarity), it is understood that the integrated circuit design 140 may be segmented into any number of bins. Further, it is understood that integrated circuit design 140 may include any number of clock domains or clock gating domains. That is, the integrated circuit design 140 may be segmented for each of the clock domains, alternatively a given bin, e.g. bin 140A, may include latches belonging to multiple, different clock domains (or clock gating domains).

FIG. 1 further illustrates a weighted centroid location 80 (shown as a star) within polygon 40 and within neighborhood N. The determination of weighted centroid location is discussed below in reference to FIG. 3. Polygon 40 is illustrated having boundary vertices 10. Each boundary vertex 10A-D is shown as a small dot and each boundary vertex 10A-D is shown with its accompanying estimated slack values 60A-D. Vertex 10A is assigned slack value 60A of +10. Vertices 10B, 10C and 10D are assigned slack values 60B, 60C and 60D of +20, +30 and +40, respectively. A slack value 60 may be described as a difference between the required time and the actual arrival time of a data signal at the output of each boundary vertex 10. The slack values 60 may be estimated by any means now known in the art or later developed.

Located spare latches 90 are shown as empty boxes, while non-spare latches are shown with cross hatching. The nearest spare latch 90N to weighted centroid location 80 is indicated. It should be understood that while polygon 40 is illustrated as a quadrilateral, polygon 40 may have more or fewer than four sides.

Figure 2:
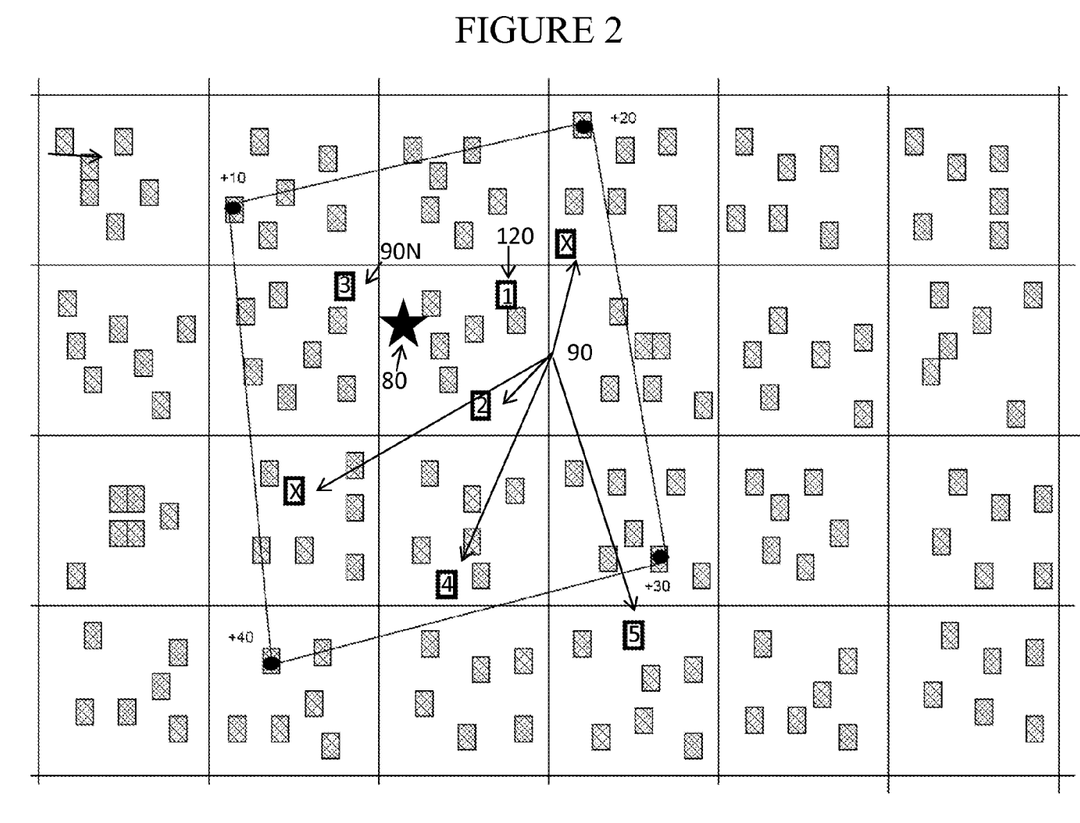
FIG. 2 illustrates a placed netlist in an integrated circuit design according to various embodiments.

Referring now to FIG. 2, the same placed netlist in the integrated circuit design of FIG. 1 is illustrated. FIG. 2 shows exemplary located spare latches 90 marked 1-5 or X. Located spare latches 90 which share the same clock domain and clock gating domain as the ECO are indicated by their rankings (1-5). Located spare latches 90 marked with an X do not share the same clock domain and/or clock gating domain as the ECO. Selected spare latch 120 is shown with a rank of 1. It should be noted that nearest spare latch 90N to weighted centroid location 80 is ranked third (3) under the algorithm described and is thus, not selected spare latch 120. The non selection of nearest spare latch 90N is due to a calculation in view of the first and second weights (discussed below in reference to FIG. 3) assigned to the gate array distribution and routing congestion, even though nearest spare latch 90N shares the same clock domain and clock gating domain as the ECO. That is, the immediate area of the chip where nearest spare latch 90N is located does not share the same level of favorable attributes as selected spare latch 120 in view of first and second weights (assigned based on gate array distribution and routing congestion). This result may be because the circuit or physical design engineer weighted routing congestion more highly than gate array distribution and the location of selected spare latch 120 happens to have lesser routing congestion than the location of nearest spare latch 90N. Other reasons that selected spare latch may have been selected include proximity to boundary vertices 10 which have more favorable slack values, or combinations of reasons. As stated above, located spare latches 90 which do not share the same clock domain and the same clock gating domain as the ECO are marked with an X, and cannot be selected by the method described above.

Figure 3:
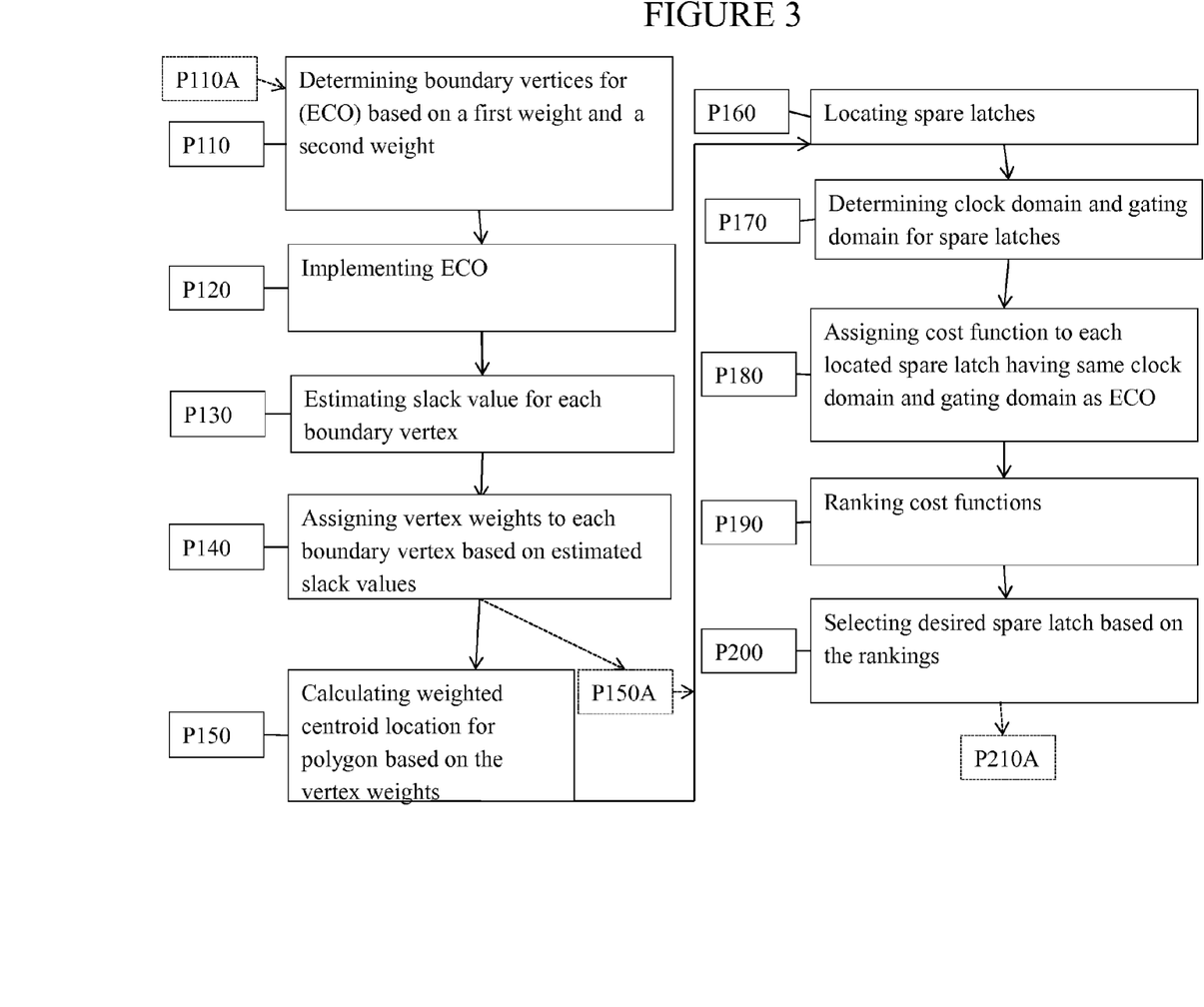
FIG. 3 shows a flow diagram illustrating a method according to various embodiments.

Turning now to FIG. 3, a flow diagram is shown illustrating a method according to various embodiments. FIG. 3 illustrates processes in a computer-implemented method 100 of selecting a desired spare latch in a placed netlist; this should be understood to include selecting a desired spare latch from the placed view of a circuit. Process P110 includes determining boundary vertices 10 for an engineering change order (ECO) within the placed netlist or within a placed view of a circuit 50 based on a first weight assigned to a gate array distribution and a second weight assigned to routing congestion. The gate array distribution may be defined as the number of gate array cells present within a given area. The gate array distribution is indirectly related to the density of functional gates within the section of the integrated circuit design that is selected for the ECO as described above in reference to FIGS. 1 and 2. The higher the density of the functional gates within a given area, lower would be the density of gate array cells, as it fits into the spaces between the functional gates. The first and second weights sum to one and preferably, they do sum to one. As an example, the first weight may be assigned a value of 0.25 and the second weight may be assigned a value of 0.75. These values depend on the desires or needs of the circuit or physical design engineer. The circuit or physical design engineer may assign a high value to the first weight in a case where routing is of high importance and the designer may assign the higher value to the second weight in cases based on the size of the ECO. If the size of the ECO is large then a greater number of gate array cells is needed to attain a design closer and hence a spare latch with relatively higher density of gate array cells in its neighborhood is required. The boundary vertices 10 define a polygon 40, as illustrated in FIG. 1.

Figure 4:
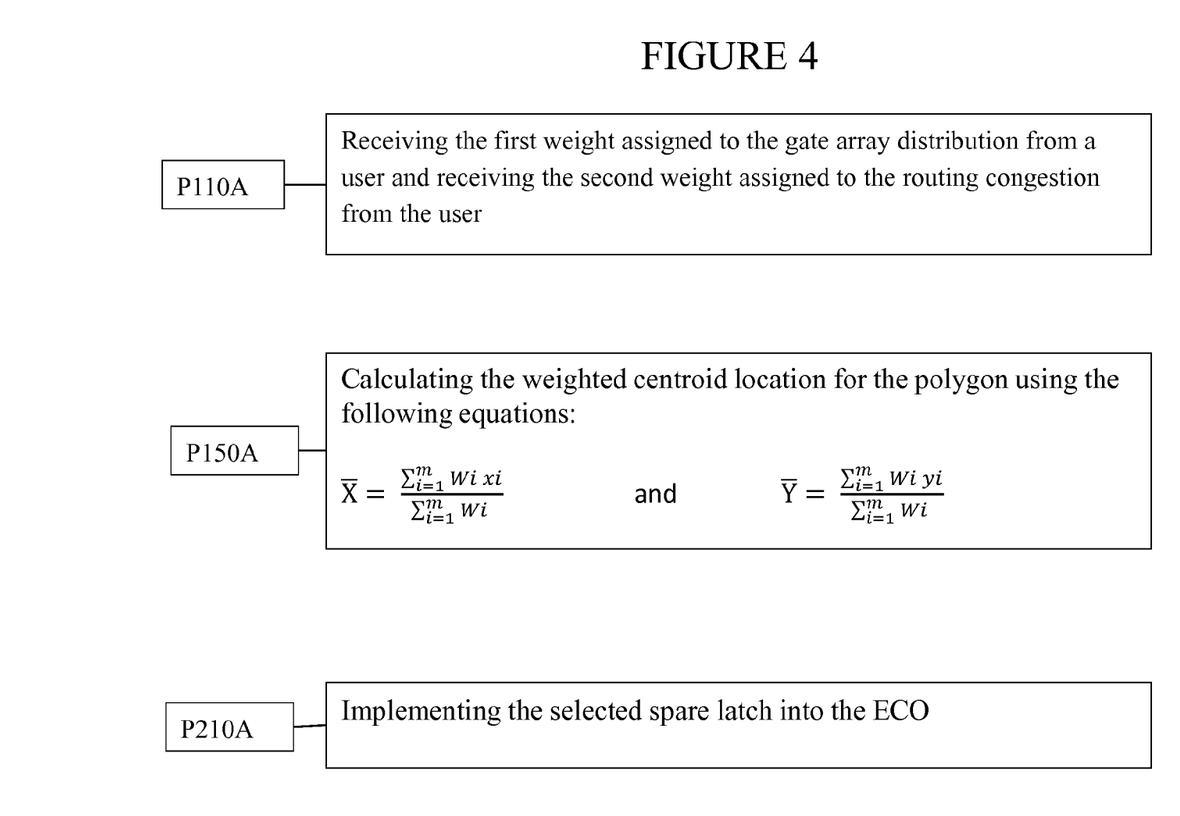
FIG. 4 shows a diagram illustrating optional processes which may be used in methods according to various embodiments.

Optional process P110A is shown in dashed lines to indicate the optional nature of the process. Optional process P110A includes receiving the first weight assigned to the gate array distribution from a user 812 (user 812 illustrated in FIG. 5) and receiving the second weight assigned to the routing congestion from the user 812. The user 812 may be a human circuit or physical design engineer, or a technician working on or implementing the ECO, the user may be a non-human system user. Optional process P110A is illustrated in FIG. 4.

FIG. 3 further illustrates process P120, which includes implementing the ECO at gate level within the placed netlist or layout 50. The implementation of the ECO may include altering metal layers within the chip, in order to reroute a logic circuit/data path. A circuit or physical design engineer implements an ECO, for example, in order to correct an error or to improve timing or performance of a data path/logic circuit and/or to ensure that all gates within a logic circuit/path share the same clock domain and clock gating domain, as described above with reference to FIGS. 1 and 2.

Process P130 includes estimating slack values 60 for each determined boundary vertex 10. The slack values 60 may be estimated by any means now known in the art or later developed and were discussed above in respect to FIG. 1.

Process P140 includes assigning vertex weights to each boundary vertex 10 based on the estimated slack values 60 for each respective boundary vertex 10 determined in process P130. The estimation of slack values is discussed above in reference to FIG. 1. The values of the vertex weights may be the estimated slack values 60 of the respective boundary vertices 10 in nanoseconds, picoseconds or any other unit of time measurement. Alternatively, the vertex weights may be linearly related to the estimated slack values 60. Furthermore, the vertex weights may be non-linearly related to the actual slack values associated with each boundary vertex 10.

Process P150 includes calculating a weighted centroid location 80 for the polygon 40 based on the vertex weights. The weighted centroid location 80 sits at a location within the vertices 10 of polygon 40, generally closer to boundary vertices 10 having most favorable slack values 60 and further from boundary vertices 10 having less favorable slack values 60, rather than simply being located at the geometric center of the polygon 40. This calculation may be done using x-y coordinate geometry and the vertex weights to determine the distance of the centroid location 80 from each of the boundary vertices 10.

Optional process P150A is shown with dashed lines to indicate the optional nature of this process. Optional process P150A includes calculating the weighted centroid location 80 for the polygon 40 using the following equations:

$$\overline{X} = \frac{\sum_{i=1}^{m} W_i x_i}{\sum_{i=1}^{m} W_i}$$

and $$\overline{Y} = \frac{\sum_{i=1}^{m} W_i y_i}{\sum_{i=1}^{m} W_i},$$

wherein i is an index for each vertex, m is the number of vertices, W is the weighted value for each vertex, i, $x_i$ is the x-coordinate for each vertex, i, $y_i$ is the y-coordinate for each vertex, i, $\overline{X}$ is an x-coordinate of the weighted centroid, and $\overline{Y}$ is a y-coordinate of the weighted centroid. Optional process P150A is illustrated in FIG. 4.

Process P160 includes locating spare latches 90 in the placed netlist 50. The locating of the spare latches 90 may be performed using a spiral search algorithm SSA. Such algorithms are well known in the art. An SSA may be performed starting from the weighted centroid location 80, or from another location, and follow a spiral path, moving outward, searching for latches that are not currently in use in a logic circuit or data path, and are therefore "spare".

Process P170 includes determining a clock domain and a gating domain for each located spare latch 90. The clock domain and gating domain are properties of each spare latch 90. The clock domain and clock gating domain of a spare latch 90 will determine whether a spare latch 90, located during process P160, e.g., by SSA, will be useful in the ECO as implemented. A located spare latch 90 that does not share the clock domain and clock gating domain of the ECO will not be of use. It should be understood that the ECO is implemented to alter circuitry within a given logic circuit. It should be further understood that the terms clock domain of the ECO and clock gating domain of the ECO refer to the clock domain and clock gating domain for the logic circuit that the ECO is implemented to alter.

Process P180 includes assigning a cost function 110 to each located spare latch 90 having a same clock domain and a same clock gating domain as the ECO. The cost function 110 may be assigned based on any or all of the following: the first and second weights, availability of gate array cells, routing congestion, timing aspects related to the paths in and out of the ECO and estimated slack values for nearby boundary vertices. An example of calculation of cost function is as follows: considering the number of gate array cells in 'N' neighborhood bins is 'X', total number of gate array cells in the design as 'Y', number of routing tracks used in 'N' neighborhood bins is 'A and the number of tracks available is 'B', then the cost function C is given by $C=W_1 (X/Y)+W_2 (A/B)$, where $W_1$ and $W_2$ is the input weights given by the user, which should add to one. It should be understood that the term neighborhood is meant to be a relative term and that a logic designer may assign different sizes to a neighborhood depending on different needs or different factors. For example, in a regular three-by-three grid of bins, a neighborhood may include the eight immediate neighbors of a central bin, or the neighborhood may include more or fewer bins. As a non-limiting example, N neighborhood may include all of the bins shown in FIG. 1.

Process P190 includes ranking each respective cost function 110 for each located spare latch 90.

Process P200 includes selecting a desired spare latch 120 based on the ranking of the each located spare latch 90. Selecting a desired spare latch 120 that shares the same clock domain and clock gating domain as the ECO ensures design closure from a timing point of view. Selecting the desired spare latch 120 with the most favorable ranking based on cost function 110 helps to ensure that the optimal spare latch is the one that is selected and that the ECO is implemented in a manner that optimizes the timing and routing of the logic circuit being altered, according to the input weights provided by the user.

Optional process P210A is illustrated in FIG. 4 with dashed lines to indicate its optional nature. Optional process P210A includes implementing the selected spare latch into the ECO. Implementing the desired spare latch 120 into the ECO may include altering a metal layer to address the desired spare latch 120 in order to alter the logic circuit or data path for which the ECO is implemented and thereby include the desired spare latch in the logic circuit/data path.

It should be noted that the above method may be used to select a single spare latch in a single pass. In cases where a second spare latch may be desired, a second iteration of the method may be performed. Alternatively, a second desired spare latch may be chosen based on cost function, from the located spare latches found during the first iteration of the method.

Figure 5:
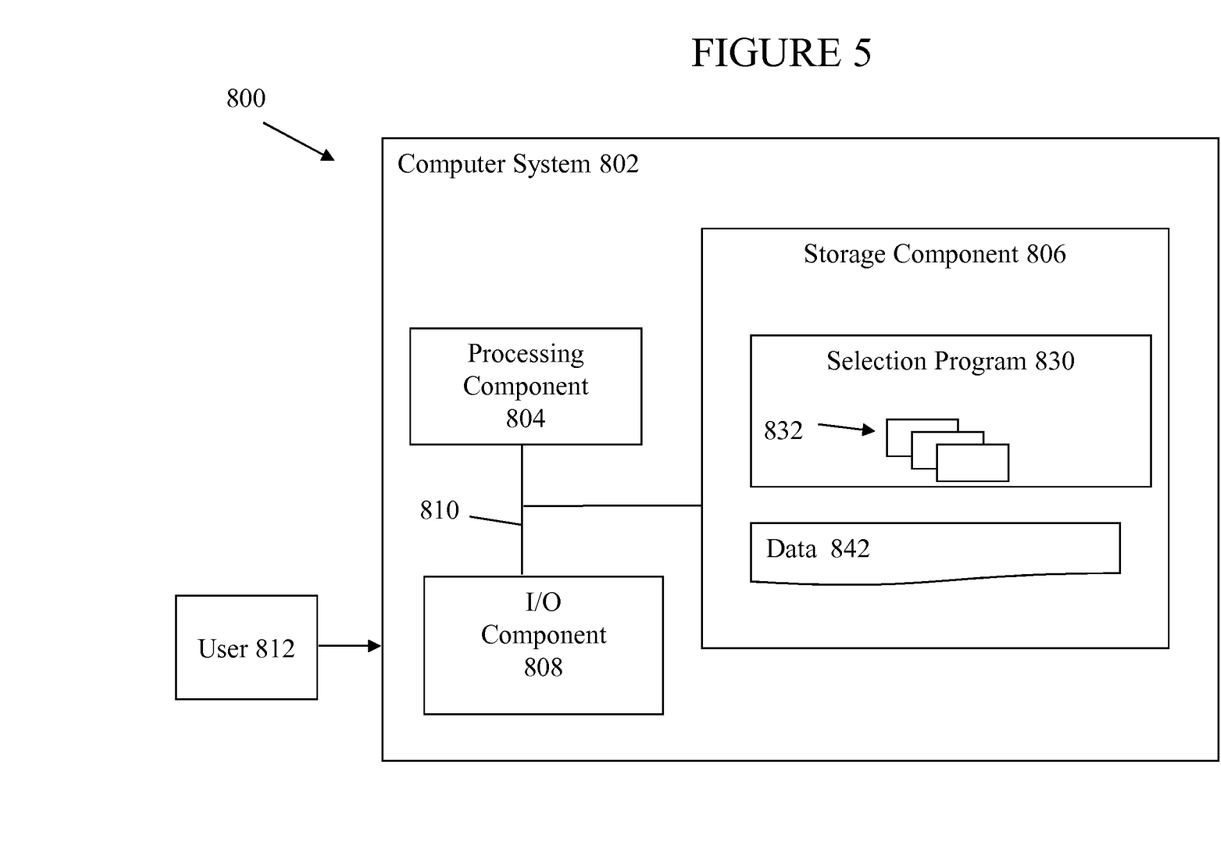
FIG. 5 shows an illustrative environment including a spare latch selection system according to embodiments.

FIG. 5 depicts an illustrative environment 800 for selecting a desired spare latch in a placed netlist. The environment 800 includes a computer system 802 that can perform a process described herein in order to select a desired spare latch. In particular, the computer system 802 is shown as including a selected spare latch determination program 830, which makes computer system 802 operable to handle selection of a desired spare latch by performing any/all of the processes described herein and implementing any/all of the embodiments described herein.

The computer system 802 is shown including a processing component 804 (e.g., one or more processors), a storage component 806 (e.g., a storage hierarchy), an input/output (I/O) component 808 (e.g., one or more I/O interfaces and/or devices), and a communications pathway 810. In general, the processing component 804 executes program code, such as the determination program 830, which is at least partially fixed in the storage component 806. While executing program code, the processing component 804 can process data, which can result in reading and/or writing transformed data from/to the storage component 806 and/or the I/O component 808 for further processing. The pathway 810 provides a communications link between each of the components in the computer system 802. The I/O component 808 can comprise one or more human I/O devices, which enable a human user 812 to interact with the computer system 802 and/or one or more communications devices to enable a system user 812 to communicate with the computer system 802 using any type of communications link. To this extent, spare latch selection determination program 830 (hereinafter determination program 830) can manage a set of interfaces (e.g., graphical user interface(s), application program interface, etc.) that enable human and/or system users 812 to interact with determination program 830. Further, the determination program 830 can manage (e.g., store, retrieve, create, manipulate, organize, present, etc.) data, such as post-OPC data 842, etc., using any solution.

In any event, the computer system 802 can comprise one or more general purpose computing articles of manufacture (e.g., computing devices) capable of executing program code, such as the determination program 830, installed thereon. As used herein, it is understood that "program code" means any collection of instructions, in any language, code or notation, that cause a computing device having an information processing capability to perform a particular function either directly or after any combination of the following: (a) conversion to another language, code or notation; (b) reproduction in a different material form; and/or (c) decompression. To this extent, the determination program 830 can be embodied as any combination of system software and/or application software.

Further, the determination program 830 can be implemented using a set of modules 832. In this case, a module 832 can enable the computer system 802 to perform a set of tasks used by the determination program 830, and can be separately developed and/or implemented apart from other portions of the determination program 830. As used herein, the term "component" means any configuration of hardware, with or without software, which implements the functionality described in conjunction therewith using any solution, while the term "module" means program code that enables the computer system 802 to implement the functionality described in conjunction therewith using any solution. When fixed in a storage component 806 of a computer system 802 that includes a processing component 804, a module is a substantial portion of a component that implements the functionality. Regardless, it is understood that two or more components, modules, and/or systems may share some/all of their respective hardware and/or software. Further, it is understood that some of the functionality discussed herein may not be implemented or additional functionality may be included as part of the computer system 802.

When the computer system 802 comprises multiple computing devices, each computing device may have only a portion of determination program 830 fixed thereon (e.g., one or more modules 832). However, it is understood that the computer system 802 and determination program 830 are only representative of various possible equivalent computer systems that may perform a process described herein. To this extent, in other embodiments, the functionality provided by the computer system 802 and determination program 830 can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system 802 includes multiple computing devices, the computing devices can communicate over any type of communications link. Further, while performing a process described herein, the computer system 802 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

The computer system 802 can obtain or provide data, such data 842 using any solution. For example, the computer system 802 can generate and/or be used to generate data 842, retrieve data 842, from one or more data stores, receive data 842 a, from another system, send 842 to another system, etc.

While shown and described herein as a method and system for selecting a desired spare latch in a placed netlist, it is understood that aspects of the invention further provide various alternative embodiments. For example, in one embodiment, the invention provides a computer program fixed in at least one computer-readable medium, which when executed, enables a computer system to perform a method of selecting a desired spare latch. To this extent, the computer-readable medium includes program code, such as spare latch selection determination program 830 (FIG. 5), which implements some or all of a process described herein. It is understood that the term "computer-readable medium" comprises one or more of any type of tangible medium of expression, now known or later developed, from which a copy of the program code can be perceived, reproduced, or otherwise communicated by a computing device. For example, the computer-readable medium can comprise: one or more portable storage articles of manufacture; one or more memory/storage components of a computing device; paper; and/or the like.

In another embodiment, the invention provides a method of providing a copy of program code, which implements some or all of a process described herein. In this case, a computer system can process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one computer-readable medium. In either case, the set of data signals can be transmitted/received using any type of communications link.

In still another embodiment, the invention provides a method of selecting a desired spare latch in a placed netlist. In this case, a computer system, such as computer system 802 (FIG. 5), can be obtained (e.g., created, maintained, made available, etc.) and one or more components for performing a process described herein can be obtained (e.g., created, purchased, used, modified, etc.) and deployed to the computer system. To this extent, the deployment can comprise one or more of: (1) installing program code on a computing device; (2) adding one or more computing and/or I/O devices to the computer system; (3) incorporating and/or modifying the computer system to enable it to perform a process described herein; and/or the like.

It is understood that aspects of the invention can be implemented as part of a business method that performs a process described herein on a subscription, advertising, and/or fee basis. That is, a service provider could offer to characterize an optical mask as described herein. In this case, the service provider can manage (e.g., create, maintain, support, etc.) a computer system, such as computer system 802 (FIG. 5), that performs a process described herein for one or more customers. In return, the service provider can receive payment from the customer(s) under a subscription and/or fee agreement, receive payment from the sale of advertising to one or more third parties, and/or the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method of selecting a desired spare latch in a placed netlist, performed on at least one computing device, the method comprising:

determining boundary vertices for an engineering change order (ECO) within the placed netlist based on:

a first weight assigned to a gate array distribution; and a second weight assigned to routing congestion, the boundary vertices defining a polygon;

implementing the ECO at gate level within the placed netlist;

estimating slack value for each determined boundary vertex;

assigning vertex weights to each boundary vertex based on the estimated slack values for each respective boundary vertex;

calculating a weighted centroid location for the polygon using the at least one computing device, based on the vertex weights;

locating spare latches in the placed netlist;

determining a clock domain and a clock gating domain for each located spare latch;

assigning a cost function to each located spare latch having a same clock domain and a same clock gating domain as the ECO using the at least one computing device;

ranking each respective cost function for each located spare latch;

selecting the desired spare latch based on the ranking of the each located spare latch; and implementing the selected spare latch into the ECO.

2. The computer-implemented method of claim 1, wherein a sum of the first weight and the second weight equals one.

3. The computer-implemented method of claim 1, wherein the locating of the spare latches is performed using a spiral search algorithm.

4. The computer-implemented method of claim 1, further comprising receiving the first weight assigned to the gate array distribution from a user; and receiving the second weight assigned to the routing congestion from the user.

5. The computer-implemented method of claim 1, wherein a calculation for each respective cost function C is calculated using the following equation:

$$C = W_1(X/Y) + W_2(A/B),$$

wherein X is a number of gate array cells in N neighborhood bins,

Y is a total number of gate array cells in the placed netlist,

A is a number of routing tracks used in the N neighborhood bins,

B is a number of tracks available within in the placed netlist, and $W_1$ and $W_2$ are the first and second weights, respectively.

6. The computer-implemented method of claim 1, wherein the calculating of the weighted centroid location for the polygon is performed using the following equations:

$$\overline{X} = \frac{\sum_{i=2}^{m} Wixi}{\sum_{i=1}^{m} Wi}$$

and $$\overline{Y} = \frac{\sum_{i=1}^{m} W_i y_i}{\sum_{i=2}^{m} W_i},$$

wherein i is an index for each vertex,
m is the number of vertices,
$W_i$ is the weighted value for each vertex, i,
$x_i$ is the x-coordinate for each vertex, i,
$y_i$ is the y-coordinate for each vertex, i,
$\overline{X}$ is an x-coordinate of the weighted centroid, and
$\overline{Y}$ is a y-coordinate of the weighted centroid.

7. A system comprising:
at least one computing device configured to select a desired spare latch in a placed netlist by performing actions including:
determining boundary vertices for an engineering change order (ECO) within the placed netlist based on:
a first weight assigned to a gate array distribution; and
a second weight assigned to routing congestion, the boundary vertices defining a polygon;
implementing the ECO at gate level within the placed netlist;
estimating slack value for each determined boundary vertex;
assigning vertex weights to each boundary vertex based on the estimated slack values for each respective boundary vertex;
calculating a weighted centroid location for the polygon, based on the vertex weights;
locating spare latches in the placed netlist;
determining a clock domain and a gating domain for each located spare latch;
assigning a cost function to each located spare latch having a same clock domain and a same clock gating domain as the ECO;
ranking each respective cost function for each located spare latch;
selecting the desired spare latch based on the ranking of the each located spare latch; and
implementing the selected spare latch into the ECO.

8. The system of claim 7, wherein a sum of the first weight and the second weight equals one.

9. The system of claim 7, wherein the locating of the spare latches is performed using a spiral search algorithm.

10. The system of claim 7, further comprising receiving the first weight assigned to the gate array distribution from a user; and receiving the second weight assigned to the routing congestion from the user.

11. The system of claim 7, wherein a calculation for each respective cost function C is calculated using the following equation $$C = W_1(X/Y) + W_2(A/B),$$

wherein X is a number of gate array cells in N neighborhood bins,
Y is a total number of gate array cells in the placed netlist,
A is a number of routing tracks used in the N neighborhood bins,
B is a number of tracks available within in the placed netlist, and
$W_1$ and $W_2$ are the first and second weights, respectively.

12. The system of claim 7, wherein the calculating of the weighted centroid location for the polygon is performed using the following equations:

$$\overline{X} = \frac{\sum_{i=2}^{m} W_i x_i}{\sum_{i=1}^{m} W_i}$$

and $$\overline{Y} = \frac{\sum_{i=1}^{m} W_i y_i}{\sum_{i=2}^{m} W_i},$$

wherein i is an index for each vertex,
m is the number of vertices,
$W_i$ is the weighted value for each vertex, i,
$x_i$ is the x-coordinate for each vertex, i,
$y_i$ is the y-coordinate for each vertex, i,
$\overline{X}$ is an x-coordinate of the weighted centroid, and
$\overline{Y}$ is a y-coordinate of the weighted centroid.

13. A computer program product comprising program code stored on a non-transitory computer-readable medium, which when executed by at least one computing device, enables the at least one computing device to select a desired spare latch by performing actions including:
determining boundary vertices for an engineering change order (ECO) within the placed netlist based on:
a first weight assigned to a gate array distribution; and
a second weight assigned to routing congestion, the boundary vertices defining a polygon;
implementing the ECO at gate level within the placed netlist;
estimating slack value for each determined boundary vertex;
assigning vertex weights to each boundary vertex based on the estimated slack values for each respective boundary vertex;
calculating a weighted centroid location for the polygon, based on the vertex weights;
locating spare latches in the placed netlist;
determining a clock domain and a gating domain for each located spare latch;
assigning a cost function to each located spare latch having a same clock domain and a same clock gating domain as the ECO;
ranking each respective cost function for each located spare latch;
selecting the desired spare latch based on the ranking of the each located spare latch; and
implementing the selected spare latch into the ECO.

14. The computer program product of claim 13, wherein a sum of the first weight and the second weight equals one.

15. The computer program product of claim 13, wherein the locating of the spare latches is performed using a spiral search algorithm.

16. The computer program product of claim 13, further comprising receiving the first weight assigned to the gate array distribution from a user; and receiving the second weight assigned to the routing congestion from the user.

17. The computer program product of claim 13, wherein a calculation for each respective cost function C is calculated using the following equation:

$$C = W_1(X/Y) + W_2(A/B),$$

wherein X is a number of gate array cells in N neighborhood bins,
Y is a total number of gate array cells in the placed netlist,
A is a number of routing tracks used in the N neighborhood bins,
B is a number of tracks available within in the placed netlist, and
$W_1$ and $W_2$ are the first and second weights, respectively.

18. The computer program product of claim 13, wherein the calculating of the weighted centroid location for the polygon is performed using the following equations:

$$\overline{X} = \frac{\sum_{i=2}^{m} W_i x_i}{\sum_{i=1}^{m} W_i}$$

and $$\overline{Y} = \frac{\sum_{i=1}^{m} W_i y_i}{\sum_{i=2}^{m} W_i},$$

wherein i is an index for each vertex,
m is the number of vertices,
$W_i$ is the weighted value for each vertex, i,
$x_i$ is the x-coordinate for each vertex, i,
$y_i$ is the y-coordinate for each vertex, i,
$\overline{X}$ is an x-coordinate of the weighted centroid, and
$\overline{Y}$ is a y-coordinate of the weighted centroid.

* * * * *